United States Patent  [11] 3,603,990

[72] Inventor Joseph L. Poirier
 26 Brain Road, Chelmsford, Mass. 01824
[21] Appl. No. 746,956
[22] Filed July 23, 1968
[45] Patented Sept. 7, 1971

[54] SPECTRUM ANALYSIS RADAR SYSTEM
 10 Claims, 11 Drawing Figs.
[52] U.S. Cl. ..................................................... 343/5,
 343/12, 343/14
[51] Int. Cl. ..................................................... G01s 9/02,
 G01s 9/24
[50] Field of Search ............................................. 343/12, 14,
 5

[56] References Cited
 UNITED STATES PATENTS
2,958,862 11/1960 Rey ............................... 343/14
3,343,164 9/1967 Clarke ........................... 343/14
3,355,734 11/1967 Albanese ....................... 343/14
3,495,243 2/1970 Russell ......................... 343/14

Primary Examiner—Malcolm F. Hubler
Attorneys—Harry A. Herbert, Jr. and George Fine ABSTRACT: A radar system and method in which the returned target signal is added to a reference signal derived from the original transmitted signal. The power spectrum of the sum signal is modulated. The modulation frequency is a linear function of the range and is measured to determine the range to a target. The transmitted signal must be time stationary (i.e., a noiselike signal) and the range to the target must be equal to or greater than the ratio of the speed of light divided by the bandwidth of the signal.

SPECTRUM ANALYSIS RADAR SYSTEM

BACKGROUND OF THE INVENTION

This invention relates to a method and system for obtaining range measurements of a target of interest by electromagnetic radiation directed towards the target, and more particularly, a method and system wherein a time stationary signal is directed towards a target and the return signal therefrom is added to a portion of the time stationary signal to provide a resultant that is spectrum analyzed to provide the desired target measurement.

The measurement of distance or range by means of electromagnetic radiation has had considerable use in the field of radar and other related applications as proximity fuse radars countermeasure application and for detection of signals in clutter. In one of the prior art systems the transmitted electromagnetic signal comprises two random energy signals derived from a random energy signal source which have been mode uncorrelated by separating the two signals in the time or frequency domain. When these two signals are received after reflection from a target, the time or frequency separation provided is eliminated so that the signals are again correlated. These correlated signals are then multiplied together and the multiplied output integrated to produce a signal which is delayed with respect to the transmitted signal by an amount proportional to the distance between the system and the target.

The present invention, however, includes the unique concept that a single stationary time signal such as unmodulated random noise may be used for accurate ranging by simple spectrum analyzation. This technique works for cw and pulsed radars. The system resulting from the aforesaid concept can be used to advantage in applications such as proximity fuse radars, countermeasures, and for detection of signals in clutter.

One of the novel features of the invention is the use of time stationary signals instead of coherent signals to illuminate the target. Another is the analysis of the power spectrum of the signal to determine the range (and magnitude) of the target.

SUMMARY OF THE INVENTION

A time stationary signal in the form of unmodulated noise is directed at a target of interest. A small part of the noise signal is coupled off from its source and added to the target return signal. The spectrum of this sum signal will be modulated if the range R to the target, the speed of light $c$, and the bandwidth $\Delta f$ of the noise signal satisfy the relation $R$ $c/\Delta f$. The frequency difference $\Delta f_m$ between nulls in the spectrum is given by $\Delta f_m = c/2R$ and depends only on the range. A way of more conveniently extracting the range (especially for multiple targets) from the modulated sum spectrum is to detect and filter (high pass) a sum spectrum analyzer signal, which produces a new time function proportional to the sweep speed $S_s$ of the analyzer, and to analyze this new time function with a second spectrum analyzer. The final spectrum will then be a narrow spectrum centered of the modulating frequency of each target whose width depends on the width of the transmitted signal. The sweep axis of the second spectrum analyzer can be calibrated directly in range. The measured modulation frequency and the range are then related by $R = cf_m/2S_s$.

An object of this invention is to provide a method and system for measuring target information by directing a time stationary signal thereat and adding a portion of the directed signal to the target return signal and utilizing the resultant signal to provide the desired target information.

Another object of the present invention is to provide a radar method and system wherein an unmodulated noise signal is directed toward a target, with the return signal therefrom added to a portion of the unmodulated noise signal to provide a modulated sum signal in which the modulation frequency is a linear function of the range.

Various other objects, advantages, and features of novelty which characterize the invention are pointed out with particularity in the claims annexed hereto and forming a part hereof. However, for a better understanding of the invention, its advantages, and objects attained by its use, reference should be had to the subjoining drawings which form a further part hereof, and to the accompanying descriptive matter, in which there is illustrated and described preferred embodiments of the invention.

To completely describe the method and system of the present invention, the following theory is presented. The scattering of broadband signals from an array of randomly spaced discontinuities in a long transmission line was analyzed. Probability density functions for the power reflection coefficient at the input of the transmission line were obtained along with expressions for the mean and variance of the power reflection coefficient. In these analyses, only the total intensity of the reflected signals was studied. It turns out, however, that under certain conditions, depending principally on the bandwidth of the illuminating signal and the spacing between adjacent discontinuities, the power spectrum of the total reflected signal is modulated. This modulation is not the result of any modulation of the illuminating signal and in fact occurs for unmodulated signals as well. It depends only on the random nature of the stationary quasi-monochromatic illuminating signal.

Measurements have been made for two signal components (corresponding to two discontinuities) in which case the modulation frequency depends only on the relative path length difference between the two signals while the fractional modulation amplitude depends on their relative intensities.

The analysis of the scattering of stationary quasi-monochromatic signals from an array of small discontinuities was extended to include the spectral characteristics of the total reflected signal. A result of this analysis is that under certain conditions, the range, magnitude, and phase of a distant reflector can be determined from the power spectrum of the reflected signal. Because of this, the application of power spectrum analysis to a radar is provided. Expressions are obtained for the useful range and resolution of such a radar and a comparison between its resolution and that of a conventional pulse radar is made. Use of this system to measure angular location of a target is also pointed out.

Although the theory can be applied to more complex problems, only the one dimensional case of an array of scatterers in a long transmission line will be treated. Consider a line of length L along which are distributed N scatterers with an average spacing L/N which is much greater than the mean wavelength $\lambda_o$ of the radiation. The voltage reflection coefficient $\Gamma_j$ of each scatterer is assumed to be small enough to satisfy the condition that $N|\Gamma_j|^2 \ll 1$. These two restrictions insure that multiple interaction effects can be neglected although the latter restriction is easily removed. Also, the individual reflection coefficients are assumed to be constant over the bandwidth $\Delta f$ of the illuminating signal which must satisfy the quasi-monochromatic approximation $(\Delta f/f_o) \ll 1$. It is also assumed that the illuminating radiation is ergodic and time stationary so that ensemble averages may be replaced by suitably long time averages which depend only on time differences.

When the line is illuminated by a signal $V^+(t)$ having a normalized (unit area) power spectrum $\Phi^+(f)$, the total reflected voltage $V^1(t)$ at the input to the line is given by $$V^-(t) = \sum_{j=1}^{N} \Gamma_j \exp[-2\alpha l_j] V^+(t-t_j) \quad (1)$$

where $\alpha$ is the attenuation constant of the line. The time $t_j$ is the total time required for the signal to reach the $j$th reflector and return to the input of the line and is equal to $2l_j/v$ where $l_j$ is the distance to the $j$th reflector and $v$ the propagation velocity.

The complex autocorrelation of Eq. (1) is given by $$\langle V^-(t+\tau) V^{-*}(t) \rangle = \sum_{k=1}^{N} \sum_{j=1}^{N} \Gamma_k \Gamma_j^*$$
$$\exp[-2\alpha\{l_k+l_j\}] \langle V^+(t-t_k+\tau) V^{+*}(t-t_j) \rangle \quad (2)$$

where the sharp brackets indicate the infinite time average associated with the autocorrelation and the new summation index $k$ has been used to account for all the cross terms. The terms within the angular brackets in Eq. (2) are by definition, the self coherence functions $\Gamma^1(\tau)$ and $\Gamma^+(\tau)$ of the reflected and incident signals $V^1(t)$ and $V^+(t)$, respectively. That is, $$\Gamma(\tau) = \langle V^-(t+\tau) V^{-*}(t) \rangle \quad (3)$$

where $\tau$ is the time delay introduced in the correlation. The normalized form of $\Gamma^1(\tau)$ or the complex degree of self-coherence is given by $$\gamma(\tau) = \frac{\Gamma^-(\tau)}{\Gamma^-(o)} = \frac{\Gamma^-(\tau)}{I^-} \quad (4)$$

where $I^1$ is the time averaged intensity of the total reflected signal. Furthermore, the complex degree of self-coherence and the normalized power spectrum of the signal form a Fourier transform pair so that $$\gamma^-(\tau) = \int_0^\infty \phi^-(f) \exp[-i2\pi f\tau] df \quad (5)$$

Equations (3), (4), and (5) when applied to both sides of Equation (2) yield $$I^- \phi^-(f) = \sum_{k=1}^{N} \sum_{j=1}^{N} |\Gamma_k||\Gamma_j|$$
$$\exp[-2\alpha\{l_k+l_j\}] I^+ \phi^+(f) \ldots \cos[2\pi f\{t_j-t_k\} + \theta_j - \theta_k] \quad (6)$$

where $\theta_j$ and $\theta_k$ are the phases associated with the voltage reflection coefficient of the $j$th and $k$th reflectors.

If the round trip path length difference between any pair of reflectors is much smaller than the coherence length $l_c = v/\Delta f$, the argument of the cosine term in Equation (6) will principally depend on $\{t_j-t_k\}$ over the bandwidth $\Delta f$ and $f$ may be replaced by the mean frequency $f_o$. Under these conditions Equation (6) when integrated over all frequencies yields $$I^- = \sum_{k=1}^{N} \sum_{j=1}^{N} |\Gamma_k||\Gamma_j|$$
$$\exp[-2\alpha\{l_k+l_j\}] I^+ \ldots \cos[2\pi f_o\{t_j-t_k\} + \theta_j - \theta_k] \quad (7)$$

and $$\Phi^1(f) = \Phi^+(f) \quad (8)$$

Equations (7) and (8) are the well known interference laws for coherent signals $(v|t_j-t_k| \ll v/\Delta f)$.

Conversely, if $|t_j-t_k| \gg 1/\Delta f$ integration of Equation (6) will cause the cosine terms to vanish, except when $j=k$ in which case we obtain $$I^- = \sum_{j=1}^{N} |\Gamma_j|^2 I^+ \exp[-4\alpha l_j] \quad (9)$$

Equation (9) is of course the law of incoherent addition of signal powers. The power spectrum of the total reflected signal in this case however is $$\phi^-(f) = \phi^+(f) \frac{I^+}{I^-} \sum_{k=1}^{N} \sum_{j=1}^{N} |\Gamma_k||\Gamma_j|$$
$$\exp[-2\alpha\{l_j+l_k\}] \ldots \cos[2\pi f\{t_j-t_k\} + \theta_j - \theta_k] \quad (10)$$

Equation (10) indicates that the power spectrum of the total reflected signal is modulated and that the modulation frequencies depend only on the relative time delays $|t_j-t_k|$ corresponding to the path length delays $|l_j-l_k|$. The frequency difference $f_m$ between successive nulls $f_n$ in $\Phi^1(f)$ due to a component pair is easily shown to be from Equation (10)

$$\Delta f_m = \frac{1}{|t_j-t_k|} = \frac{v}{2|l_j-l_k|} \quad (11)$$

The modulation occurs at $N(N-1)/2$ different frequencies corresponding to all possible distinct pair values of $j$ and $k$.

The fractional modulation amplitude $M_{jk}$ of each component pair depends on their relative intensities and is given by $$M_{jk} = \frac{I_{max} - I_{min}}{I_{max} + I_{min}} = \frac{2\Gamma_j \Gamma_k I^+}{I^-} \exp[-2\alpha\{l_j+l_k\}] \quad (12)$$

where $I_{max}$ and $I_{min}$ are adjacent maximum and minimum values of the power spectrum. The phases $\theta_j$ of the reflectors fix the absolute location $f_n$ of the nulls in the power spectrum.

At this time it should be pointed out that the ratio $I^+/I^1$ in Equation (12) and elsewhere is the reciprocal of the power reflection coefficient R at the input to the line. Expressions for R and $p(R)$ the probability density function for R when the scatterers are randomly distributed exist. If the line is incoherently illuminated $(l_o \ll |l_j-l_k|)$ the result is $$R = \frac{I^-}{I^+} = \sum_{j=1}^{N} |\Gamma_j|^2 \exp[-4\alpha l_j] \quad (13)$$

In the partially coherent case Equation (13) is much more complicated and R depends on $\gamma^+(\tau)$.

To demonstrate the application of Equation (10), consider a long transmission line with only two reflectors $\Gamma_1$ and $\Gamma_2$ located at $l_1=0$ and $l_2$ respectively. For convenience, the signal attenuation has been lumped into the voltage reflection coefficient, i.e., $\Gamma'_2 = |\Gamma_2 \exp[-2\alpha l_2]$. If $v/\Delta f \leq l_2$, Equation (13) can be used to write Equation (10) as $$\phi^-(f) = \phi^+(f) \left\{ 1 + \frac{2|\Gamma'_1||\Gamma'_2|}{|\Gamma'_1|^2 + |\Gamma'_2|^2} \cos\left[\frac{4\pi f \Gamma_2}{v} + \theta_2 - \theta_1\right] \right\} \quad (14)$$

Figure 1:
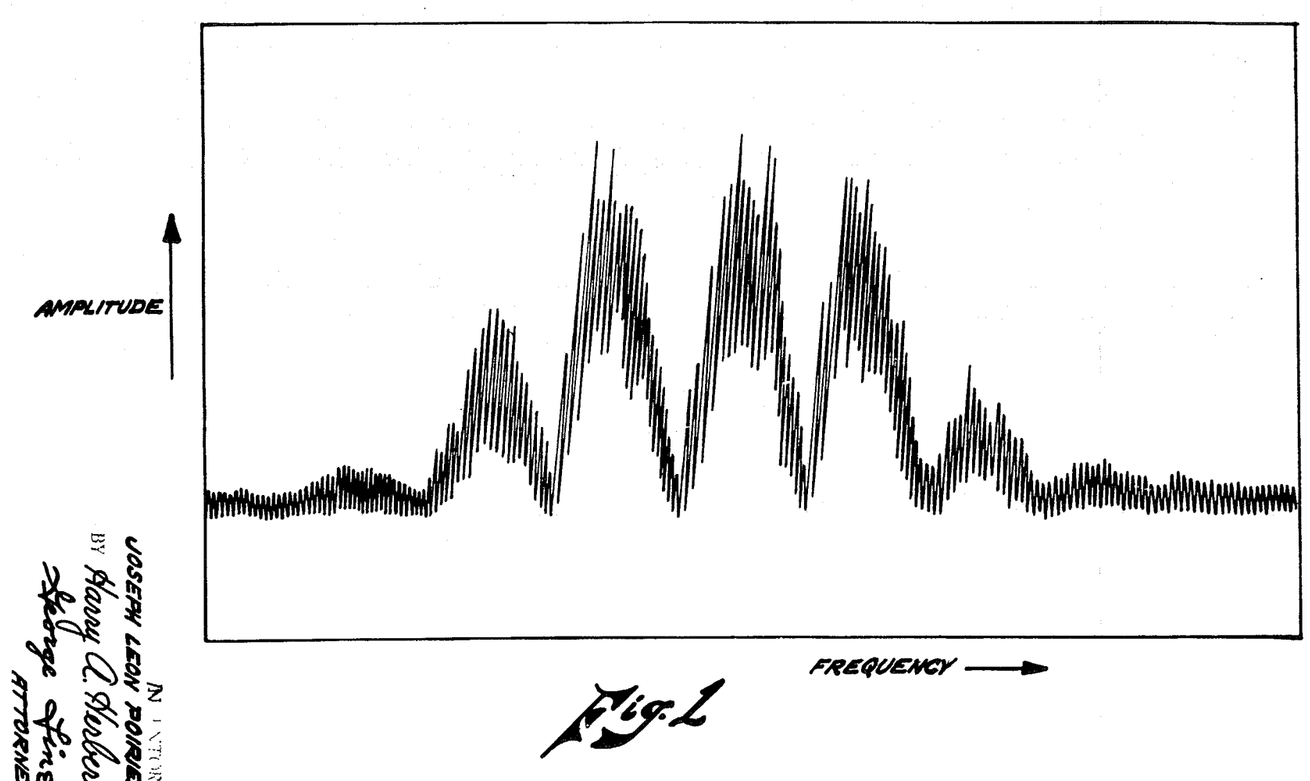
FIG. 1 illustrates a power spectrum representative of a return signal.

The frequency difference between nulls $\Delta f_m$, the fractional modulation amplitude $M_{12}$, and the absolute location $f_n$ of the nulls can be determined by measuring $\Phi^1(f)$ with a spectrum analyzer. (The spectrum shown in FIG. 1 was observed in a laboratory experiment performed at 2800 MHz. with $l_2=30m$ and $\Delta f=12$ MHz.) From these measurements there results $$l_2 = \frac{v}{2\Delta f_m} \quad (15)$$

and $$\Gamma'_2 = \left\{ \frac{1 \pm \sqrt{1-M_{12}^2}}{M_{12}} \right\} \Gamma'_1 \quad (16)$$

from which $\Gamma_2$ may be obtained by using Equation (15).

The phase of $\Gamma_2$ to within an uncertainty of $2\pi$ is found to $$\theta_2 = \theta_1 + \left[2\pi + 1 - \frac{2f_n}{\Delta f_m}\right]\pi, \quad \pi = 0, \pm 1, \ldots \quad (17)$$

Because the location and characteristics of a distant reflector (target) can be determined from the power spectrum of the superposition of the reflected signal and part of the illuminating signal (derived from $\Gamma_1$ in the two reflector example) this system is in effect a radar.

Figure 2:
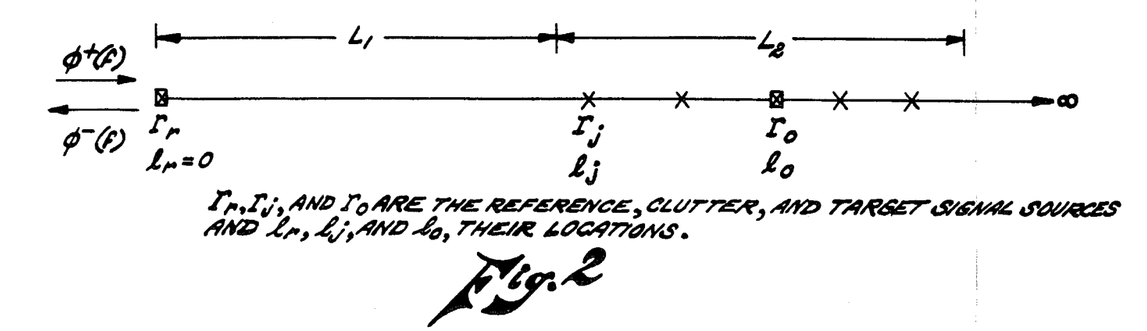
FIG. 2 is a pictorial representation of spectrum analysis radar system parameters.

FIG. 2 pictorially illustrates the application of power spectrum analysis to a radar problem in which a target $\Gamma_o$ at a range $l_o$ is immersed in clutter scatterers (assumed to be all equal) and $L_1 \geq l_c = \frac{c}{\Delta f}$. A portion of the transmitted signal $\Gamma_r V^+(t)$ is used as the reference signal so that $l_r=0$. For convenience the effects of free space attenuation are included in $\Gamma_o$ and the $\Gamma_j$ and the phase $\theta_r$ of the reference signal $\Gamma_r V^+(t)$ is set equal to zero.

In the absence of clutter, measurement of $\ast\ast^1(f)$ would yield $l_o$, $|\Gamma_o|$ and $\theta_o$ directly, analogous to the two reflector problems described by Equations (14) through (17). However, in the presence of clutter, Equation (10) will contain modulation components corresponding to $l_o$ plus all other combinations of scatterer ranges $l_j$ and $l_k$. The frequency difference between nulls for the terms involving $l_o-l_r$ and $l_j-l_r$ where $l_j$ is the range to one of the scatterers and $l_r=0$ is given by Equation (11). Those terms depending on the differences $|l_o-l_j|$ and $|l_j-l_k|$ may or may not produce modulations. If the coherence length $l_c=c/\Delta f \leq L_2/N$, modulations will be produced. While if $l_c$ is much greater than the interscatterer spacing Equation (8) applies and no modulation is observed. Since the desired information is contained in the term $l_o-l_r$, the latter condition seems preferable. But there is yet another factor to be considered also effecting system performance, so it is not now possible to choose the conditions for best operation. However, if the cross-term modulations are present, they will be far removed in frequency from the fundamental modulation frequencies.

The fractional modulation amplitudes are given by Equation (12) and are $$M_{jk} = \frac{2\Gamma_j \Gamma_k I^+}{I^-} \quad (18)$$

$$M_{jo} = \frac{2\Gamma_j \Gamma_o I^+}{I^-} \quad (19)$$

$$M_{jr} = \frac{2\Gamma_j \Gamma_r I^-}{I^-} \quad (20)$$

$$M_{ro} = \frac{2\Gamma_r \Gamma_o I^-}{I^-} \quad (21)$$

If the reasonable assumptions that $\Gamma_o >> \Gamma_j$, $\Gamma_r >> \Gamma_j$ and $N >> 1$ are made, $M_{jk}$, $M_{jo}$, and $M_{jr}$ will each be much smaller than $M_{ro}$. Thus a separation of the target return from the clutter return has been effected. This occurs because the modulation frequencies (due to the clutter) each with a small amplitude will be distributed more or less at random around the target frequency. The result then is a smearing of the modulations in the power spectrum; but the target modulation having a large amplitude will still dominate so long as $N\Gamma_j^2$ is not too large.

The denominator $I^1$ appearing in Equations (18) through (21) is the total intensity of the reflected signal. If $l_c$ is larger than the average interscatterer spacing $L_2/N$, $I^1$ can vary widely from one observation to another as the phases of the clutter components change due to antenna or other motion. If the converse is true then $I^1$ will not depend on the phases of the components (Equation (9)) but be constant and equal to the mean intensity of the previous case. The most consistent measurements would then be obtained when $I^1$ is constant and $l_c$ smaller than the interscatterer spacing thereby decorrelating the clutter return components.

Under these conditions, Equation (21) becomes $$M_{ro} = \frac{2|\Gamma_r||\Gamma_o|}{|\Gamma_r|^2+|\Gamma_o|^2+|\Gamma_c|^2} \quad (22)$$

where $|\Gamma_c|^2$ is the total clutter power and equal to $(N-2)\Gamma_j^2$. If $\Gamma_r$ is made variable, the target modulation amplitude will be maximum when $|\Gamma_r|^2 = \Gamma_o^2+|\Gamma_c|^2$. Equation (22) would then be $$M_{ro_{max}} = \frac{\Gamma_o}{\{\Gamma_o^2+|\Gamma_c|^2\}^{1/2}} \quad (23)$$

Figure 3:
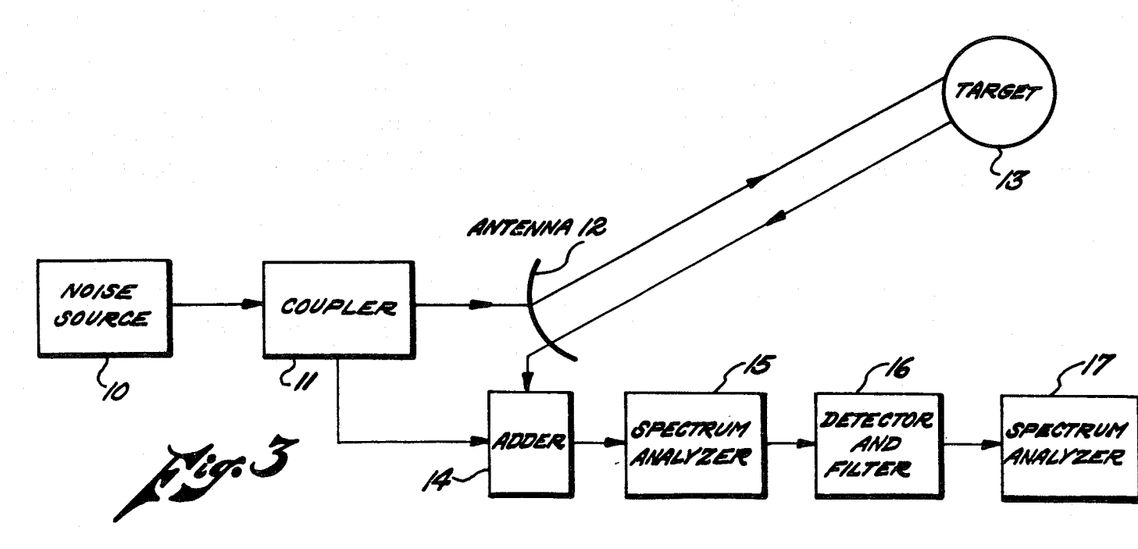
FIG. 3 is one preferred embodiment of the present invention in block diagram form.
Figure 4A:
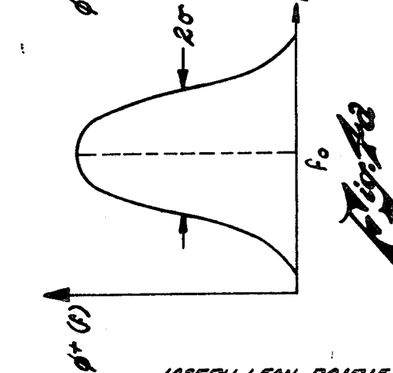
FIG. 4a shows the target illuminating spectrum for the system of FIG. 3.
Figure 4B:
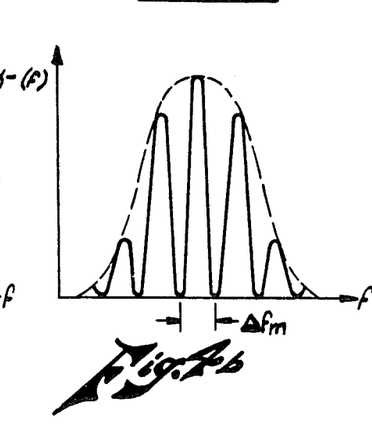
FIG. 4b shows the sum signal spectrum for the system of FIG. 3.

At this point, expressions for the useful range and resolution of this system should be obtained in order to make more meaningful comparisons with conventional radars. Consider the system of the present invention shown in FIG. 3 in which a Gaussian noise signal generated in noise source 10 and shown in FIG. 4a is used to illuminate target 13 by way of coupler 11 and antenna 12. Part of the transmitted signal obtained in this case from a directional coupler 11 is added in adder 14 to the signal reflected from the target and observed on a spectrum analyzer 15 which is illustrated in FIG. 4b. Now the sum signal spectrum analyzer output is passed through detector and high-pass filter 16, the original sum spectrum will be converted to a new time function. Second spectrum analyzer 17 can now be used to determine the frequency components present in the new time function. The following definitions for the useful range and resolution are based on a system of this type with the illuminating signal spectrum $\Phi^+(f)$ given by $$\phi^+(f) = \frac{1}{\sigma\sqrt{2\pi}} \exp\left[-1/2\left(\frac{f_o-f}{\sigma}\right)^2\right] \quad (24)$$

Figure 4C:
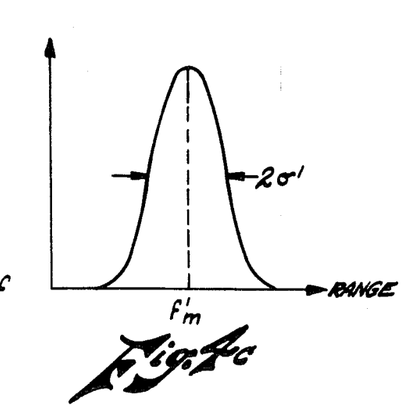
FIG. 4c shows the modulating frequency spectrum for the system of FIG. 3.

For a single target with the reference signal adjusted to be equal to the target return signal the sum spectrum is $$\phi^-(f) = \frac{1}{\sigma\sqrt{2\pi}} \exp\left[-1/2\left(\frac{f_o-f}{\sigma}\right)^2\right]\left\{1+\cos\frac{4\pi fR}{C}\right\} \quad (25)$$

and the new time function becomes after high-pass filtering $$\Phi^-(t) = \frac{k}{\sigma\sqrt{2\pi}} \exp\left[-1/2S_s^2\left(\frac{t_o-t}{\sigma}\right)^2\right]\cos\frac{4\pi R S_s t}{c} \quad (26)$$

where $S_s$ is the sweep speed of the sum signal spectrum analyzer. The spectrum of Equation (26), which is the product of two time functions, is the convolution of the spectra of the component time functions and results in a spectrum with a variance $\sigma'$ centered at the modulating frequency $f'_m = 2RS_s/c$ as shown in FIG. 4c.

The variance $\sigma'$ is a function only of the variance of the illuminating signal $\sigma$ and can be obtained by finding the transform of $$\exp\left[-1/2S_s^2\left(\frac{t_o-t}{\sigma}\right)^2\right]$$

The result is $$\sigma' = S_s/2\pi\sigma \quad (27)$$

From Equation (27) the range resolution $\Delta R$ can be defined. Two targets can just be resolved if their modulation frequencies $f'_m$ are separated by the width $2\sigma'$ of the spectral line. Therefore, $$\Delta R = 2\sigma^1\left(\frac{dR}{df_m^1}\right) = \frac{C}{2\pi\sigma} \quad (28)$$

The maximum useful range $R_{max}$ is determined by the effective i.f. bandwidth $\Delta f_a$ of the sum signal spectrum analyzer. To obtain good modulation characteristics $\Delta f_m \geq 10\Delta f_a$ so that the maximum range then is $$R_{max} = c/20\Delta fa \quad (29)$$

The minimum range depends on the coherence length of the radiation since the range must be sufficiently great so that the reflected signal is no longer correlated with the reference signal this condition can be written as $$R_{min} = l_c = (c/\Delta f) \quad (30)$$

A comparison between the resolution of a conventional pulse radar and a spectral analysis radar can now be made. The resolution of a pulse radar can be expressed as $\Delta R_p = (c\tau/2)$ where $\tau$ is the pulse width. The transform of a pulse is a function of the form $(\sin x)/x$ which yields a power spectrum of the form $(\sin^2 x)/x^2$. The normalized power spectrum of a pulse then is $$\phi^\tau(f) = \frac{1}{\pi} \frac{\sin^2 2\pi f}{(2\pi f)^2} \quad (31)$$

and the power contained in the main lobe is $$P_p = \frac{2}{\pi} \int_0^\pi \frac{\sin^2 2\pi f}{(2\pi f)^2} d(2\pi f) \quad (32)$$

Numerical integration of Equation (32) yields approximately $P_p = 0.90$. To compare $\Delta R$ to $\Delta R_p$ the frequency spread of the Gaussian is restricted so that only those frequencies which make up 0.90 of the total power are considered. The frequency extreme may be found by using the relation $$\frac{2}{\sqrt{\pi}} \int_0^{x_0} \exp[-x^2] dx = 0.90 \quad (33)$$

and solving for $x_o$. From tables, $x_o = 1.18$ and the relative amplitude of $\exp[-x^2]$ at $x = x_o$ is found to be 0.25 from which the required frequency extreme in Equation (24) can be found in terms of $\sigma$. Matching the frequency extreme in the pulse and Gaussian spectra there results $1/\tau = 1.66\sigma$. The ratio of the resolution then is $$(\Delta R_p / \Delta R) = \pi \xi = 1.88 \quad (34)$$

Equation (34) indicates that a spectrum analysis radar operating with a bandwidth equivalent to a conventional pulse radar offers an 88 percent improvement in resolution.

Figure 5:
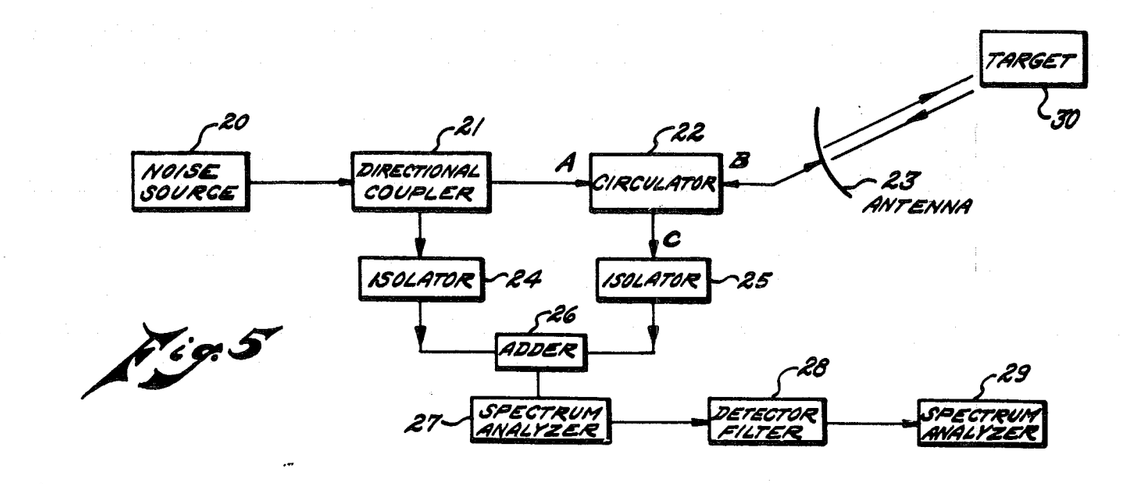
FIG. 5 shows a second embodiment of the present invention.

Now referring to FIG. 5, to be used as a radar technique, power spectrum analysis requires that a target 30 be illuminated by a noise or noiselike signal and that a reference signal (a small part of the transmitted signal) be available. The signal to be analyzed is the sum of the reference and the signal reflected from the target. The power spectrum of this sum signal will be modulated and the frequency difference between nulls related to the rough by $R = (c/2\Delta f_m)$ where $c$ is the velocity of light and $\Delta f_m$ the frequency difference between nulls.

A stationary time signal such as unmodulated noise is provided by noise generating source 20. The unmodulated noise signal from noise generating source 20 is fed to circulator 22 by way of directional coupler 21. The noise signal is then passed to antenna 23 and is directed therefrom to target 30. The reflected signal from target 30 is received by antenna 23 and passes to circulator 22 and then to isolator 25. It is noted that circulator 22 operates in the same fashion as a duplexer. Simultaneously, a portion of the noise signal is received by isolator 24 from directional coupler 21. Adder 26 receives the outputs from isolator 24 and 25 and provides a sum signal to spectrum analyzer 27. The output of spectrum analyzer 27 is passed through detector and high pass filter 28 to spectrum analyzer 29 to provide substantially the same results as described for the system shown in FIG. 3.

Figure 6:
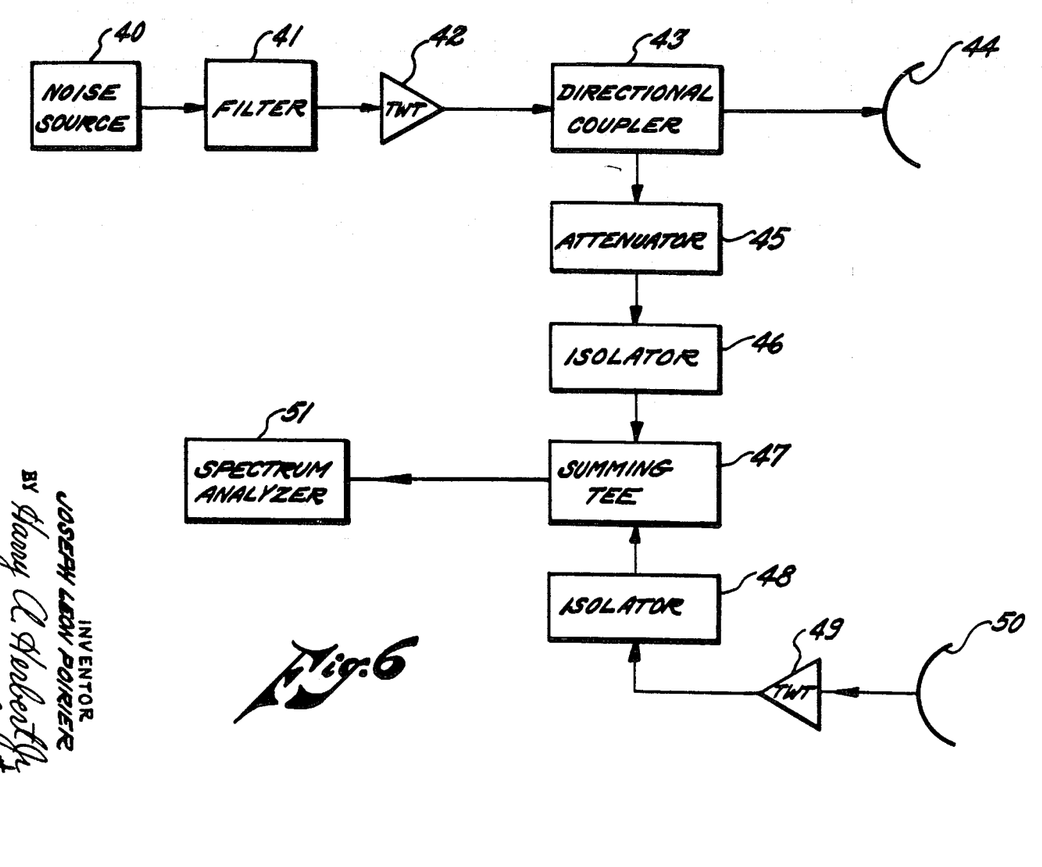
FIG. 6 shows a third embodiment of the present invention.
Figure 7:
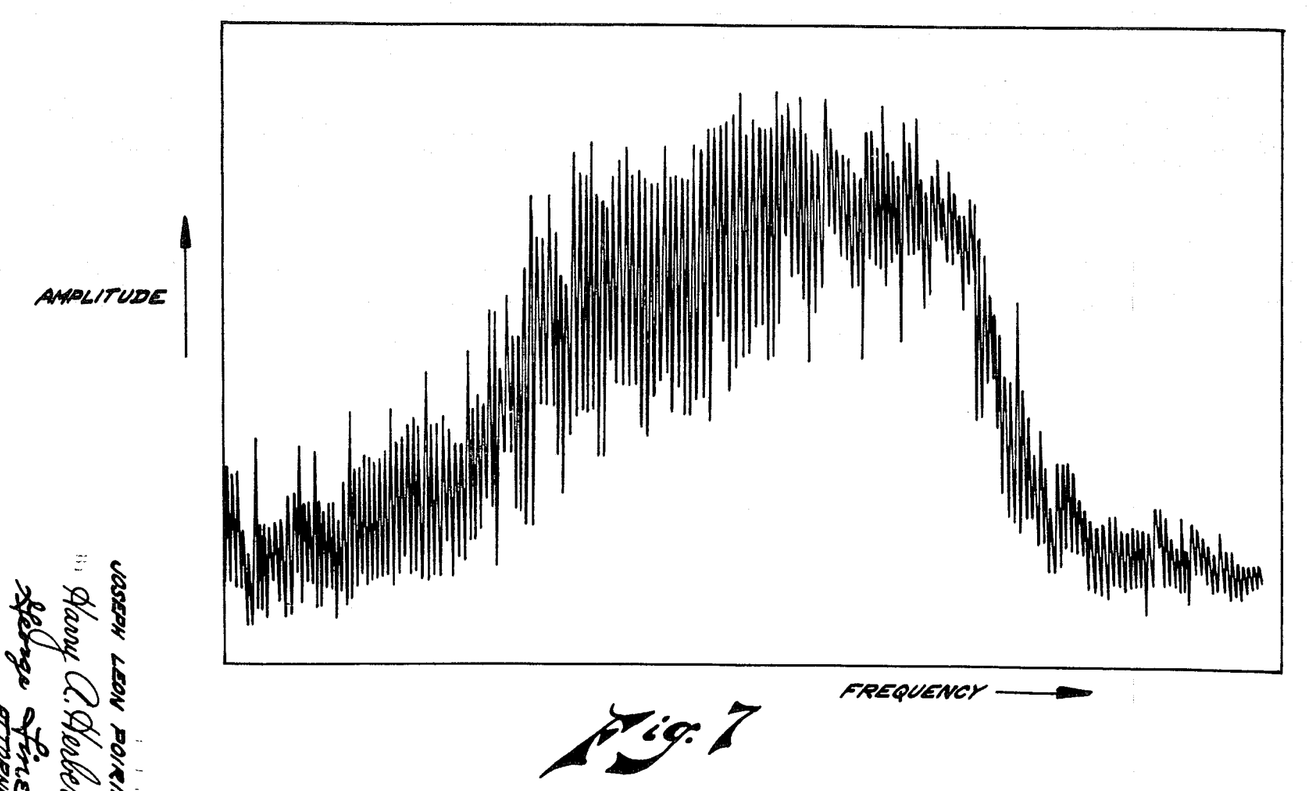
FIG. 7 shows the transmitted spectrum.
Figure 8:
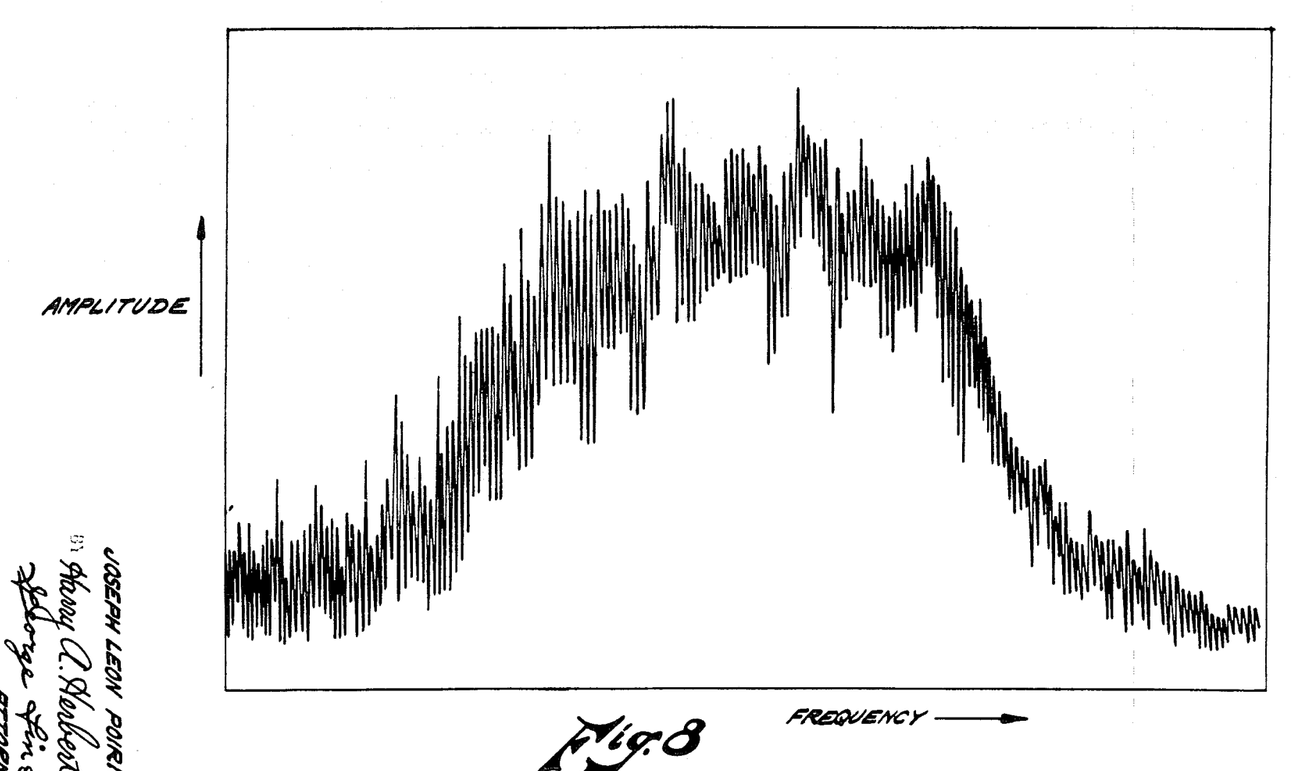
FIG. 8 shows the received spectrum.
Figure 9:
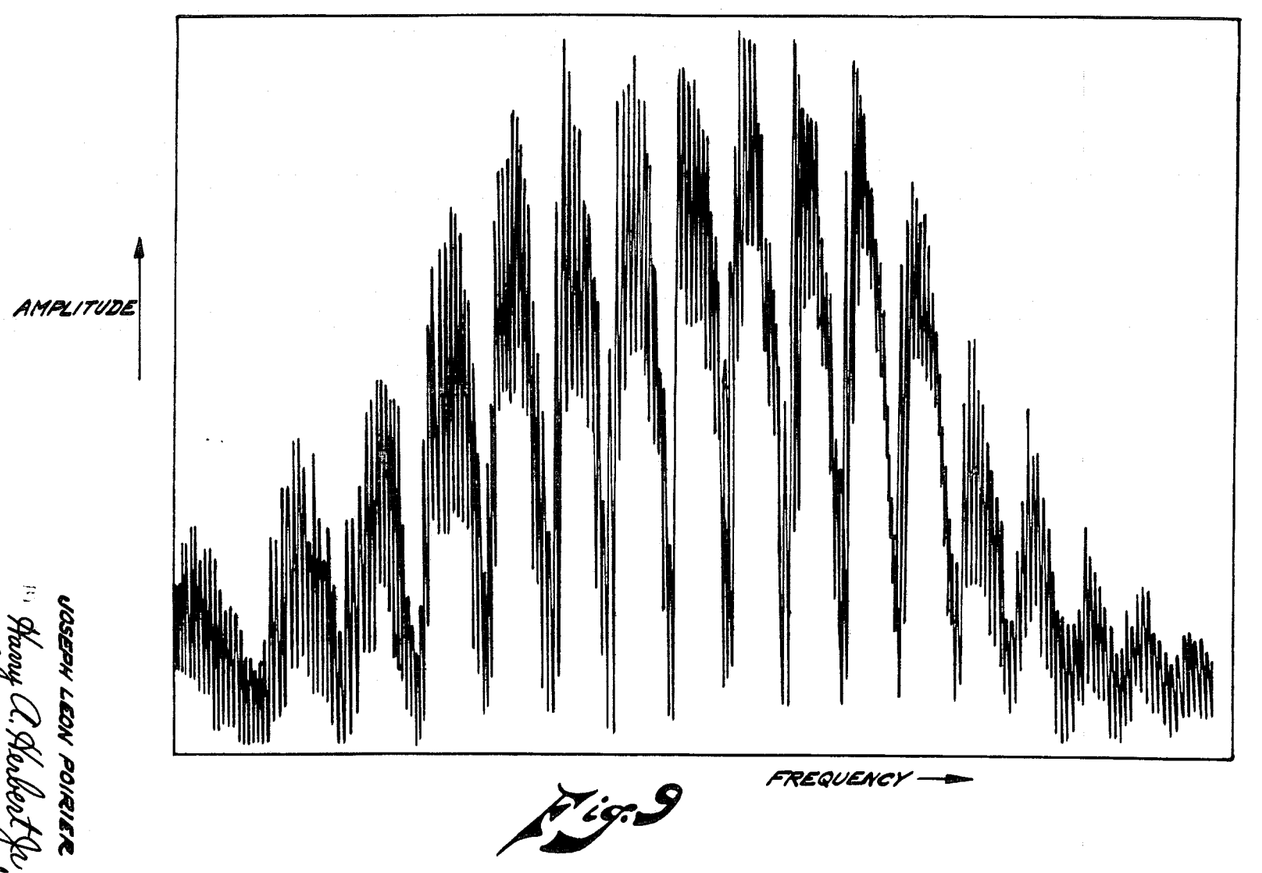
FIG. 9 shows the sum signal spectrum.

Now referring to the system of FIG. 6, here the separation between transmitted and received signals is obtained by using two separate antennas 44 and 50. A noise signal is obtained from gaseous discharge noise source 40 and is restricted in bandwidth to a preselected value by filter 41, amplified in traveling wave tube 42 and passed to transmitting antenna 44 by way of directional coupler 43. Antenna 44 is utilized to direct the noise signal to a target of interest. A small part of the noise signal is coupled off directional coupler 43, reduced to a proper level by attenuator 45, and passed through isolator 46 to summing tee 47. The reflected signal from the target of interest is received by antenna 50, amplified to a suitable level by traveling wave tube 49 and passed through isolator 48 to summing tee 47. The sum of the reference and received signals is then observed on spectrum analyzer 51. The spectrum shown in FIG. 7 was transmitted, that shown in FIG. 8 was received, and that shown in FIG. 9 was observed at the output of summing tee 47. By measuring the frequency difference between nulls in the spectrum of FIG. 9 the range to the target was found to be by equation 325 feet. The range measured with a tape measure was 324 feet.

The bandwidth of the noise filter should be at least equal to the ratio of the speed of light divided by the range to the target; otherwise no modulation of the power spectrum will occur. It is also noted that the maximum response occurs when the reference signal is equal in magnitude to the reflected signal at the point of summation. It is further noted that by increasing the bandwidth of the noise signal range accuracy and resolution improve.

Now referring again to FIG. 5, to make the system more useful, the output of spectrum analyzer 27 (which is the vertical deflection signal thereto and is the amplitude spectrum) is detected and filtered by detector and filter 28 so that only the modulating waveform is retained. This waveform, however, is automatically converted to a new time function by the sweep action of the spectrum analyzer. By analyzing this signal with second spectrum analyzer 29, the modulating frequency and thus the range can be determined by $R = (f_m c/2S_s)$ where $f_m$ is the modulating frequency measured on the second analyzer 29, $c$ is the velocity of light, and $S_s$ is the sweep speed of first spectrum analyzer 27. It is also practical to calibrate spectrum analyzer 29 in range. The operating characteristics of the system shown in FIG. 6 were center frequency—2800 MHz.; bandwidth—12 MHz.; noise spectrum—approximately Gaussian.

An analysis of the power spectrum of the total reflected signal from a number of scatterers illuminated by quasimonochromatic signals has been described and also the application of this technique to a radar. A few more comments about the use of spectrum analysis as a radar technique should, however, be made. The resolution improvement given by Equation (34), for example, cannot be immediately translated to an improved system. Unlike conventional pulse radars in which a resolution cell is roughly equal to the illuminated zone, the resolution of this system is independent of the illuminated area so long as the clutter does not completely wash out the target modulation (Equation 23). It is, however, true that the modulations due to the clutter are both reduced in amplitude and distributed in frequency. Because of this there is a natural selection or enhancement of the signal reflected from a target. If we assume that a 20 percent modulation amplitude is measurable, then for the lossless case, a target reflecting 16 db. less power than the total scatterer power would be observable as long as the target modulation frequency is resolvable (Equation 28). In a lossy system, the decrease in intensity of the target signal due to attenuation will decrease the modulation depth of the target component compared to the clutter components which originate in front of the target. It, therefore, is desirable to illuminate regions which are restricted enough to keep the relative attenuation between extremes of the region small. However, in applications where the clutter background is low, large areas could be illuminated and multiple targets (with different ranges) could be simultaneously observed. In any event, comparisons between spectrum analysis and other radars must be carefully made for a particular application.

The angular location of a target can be determined by using two systems (or one time shared between two antennas) separated by a distance $d$. The small difference in range to the target as seen by each of the antennas will cause the location of the nulls observed in the spectrum of one system to shift relative to the other. If the spacing between antennas is known, this shift can be converted into angular position. Other system properties are that since the modulating frequency depends only on the range to the target, a history of the modulating frequency will yield the unambiguous radial velocity of the target. Also since the system does not require motion of the target relative to the clutter it can be used against stationary targets or in applications where both the clutter and the target are moving.

Although the present description is based on cw signals there is no fundamental reason why pulses could not be used to diminish the illuminated clutter area to improve system performance in high clutter background applications. The pulses should be made as narrow as possible without their spectra modifying the spectrum due to the scatterers and the target. In any case, the amount of target information obtained depends on how carefully the spectrum can be analyzed. Certainly there are several methods available to instrument the system each with its own advantages.

A trend in many radars today is to use noise modulation or frequency agility to decorrelate the clutter return thereby significantly decreasing the fluctuations of the intensity of the total reflected signal. In such radars, analysis of the power spectrum may yield additional target information. In other applications, spectrum analysis radars may have some unique advantages.

What is claimed is:

1. A spectrum analysis radar method comprising illuminating a target by exclusively a time stationary signal such as unmodulated noise, summing the reflected signal from said target and a portion of the time stationary signal to provide a modulated power spectrum having nulls, equalizing the magnitude of said time stationary signal and said reflected signal prior to said summing, and measuring the frequency difference between the nulls to provide target information.

2. A spectrum analysis radar method as described in claim 1 wherein the step of illuminating said target is comprised of the step of generating said time stationary signal, and the step of transmitting said time stationary signal toward said target.

3. A spectrum analysis radar method as described in claim 1 wherein the range to said target is equal to or greater than the speed of light divided by the bandwidth of the time stationary signal.

4. A spectrum analysis radar system comprising means to generate exclusively a time stationary signal such as unmodulated noise, means to direct said time stationary signal towards a target to provide a reflected signal therefrom, means to sum said reflected signal and said time stationary signal to provide a modulated power spectrum having nulls, means to equalize the magnitude of said time stationary signal and said reflected signal prior to the summing operation, and means to measure the frequency difference between said nulls to provide target information.

5. A spectrum analysis radar system as described in claim 4 further including means to couple a portion of said time stationary signal from said generating means.

6. A spectrum analysis radar system as described in claim 4 wherein said means to measure said frequency difference is comprised of a spectrum analyzer measuring the output of said summing means.

7. A spectrum analysis radar system as described in claim 6 wherein said means to measure said frequency difference is comprised of a first spectrum analyzer receiving the output of said summing means, a detector and a filter receiving the output of said first spectrum analyzer, and a second spectrum analyzer receiving the output from said detector and filter.

8. A spectrum analysis radar system as described in claim 4 further including means to restrict the bandwidth of said time stationary signal to a preselected value.

9. A spectrum analysis radar system comprising means to generate exclusively an unmodulated noise signal, filter means to restrict the bandwidth of said noise signal to a preselected value, a directional coupler receiving the output from said filter means, said directional coupler providing a first output noise signal, and a second output noise signal with said second output noise signal being a preselected portion of the output from said filter means, an antenna receiving said first output noise signal to be directed to a target of interest to provide a reflected signal therefrom, a summing network receiving said reflected signal and said second output signal and providing as an output a modulated power spectrum having nulls, attenuator means interposed between said directional coupler and said summing means to adjust the magnitude of said second output noise signal to be substantially equal to that of the amplified reflected signal prior to the summing operation, and means to measure the frequency difference between said nulls to provide target information.

10. A spectrum analysis radar system as described in claim 9 further including a first amplifier interposed between said filter means and said directional coupler, and a second amplifier receiving said reflected signal prior to the summing operation.